(12) United States Patent
Price et al.

(10) Patent No.: US 11,107,461 B2
(45) Date of Patent: Aug. 31, 2021

(54) LOW-POWER AUTOMATIC SPEECH RECOGNITION DEVICE

(71) Applicant: Massachusetts Institute of Technology, Cambridge, MA (US)

(72) Inventors: Michael R. Price, Cambridge, MA (US); James R. Glass, Winchester, MA (US); Anantha P. Chandrakasan, Belmont, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 96 days.

(21) Appl. No.: 16/099,589

(22) PCT Filed: May 31, 2017

(86) PCT No.: PCT/US2017/035134
§ 371 (c)(1),
(2) Date: Nov. 7, 2018

(87) PCT Pub. No.: WO2017/210256
PCT Pub. Date: Dec. 7, 2017

(65) Prior Publication Data
US 2019/0147856 A1    May 16, 2019

Related U.S. Application Data

(60) Provisional application No. 62/344,081, filed on Jun. 1, 2016.

(51) Int. Cl.
*G10L 15/16* (2006.01)
*G10L 15/14* (2006.01)
(Continued)

(52) U.S. Cl.
CPC .............. *G10L 15/16* (2013.01); *G06N 3/063* (2013.01); *G10L 15/063* (2013.01); *G10L 15/14* (2013.01);
(Continued)

(58) Field of Classification Search
CPC ......... G10L 15/02; G10L 25/09; G10L 25/15; G10L 25/93; G10L 15/005; G10L 15/063;
(Continued)

(56) References Cited

U.S. PATENT DOCUMENTS 5,479,579 A    12/1995    Duong et al.
5,790,754 A    8/1998    Mozer et al.
(Continued)

FOREIGN PATENT DOCUMENTS

EP    1 331 630 A2    7/2003
KR    20150065171 A    6/2015

OTHER PUBLICATIONS

Office Action dated Mar. 30, 2020 for Korean Patent Application No. 10-2018-7036748 with English Translation; 12 Pages.
(Continued)

*Primary Examiner* — Matthew H Baker
(74) *Attorney, Agent, or Firm* — Daly Crowley Mofford & Durkee

(57) ABSTRACT

A decoder comprises a feature extraction circuit for calculating one or more feature vectors; an acoustic model circuit coupled to receive one or more feature vectors from said feature extraction circuit and assign one or more likelihood values to the one or more feature vectors; a memory for storing states of transition of the decoder; and a search circuit for receiving an input from said acoustic model circuit corresponding to the one or more likelihood values
(Continued)

based upon the one or more feature vectors, and for choosing states of transition from the memory based on the input from said acoustic model.

13 Claims, 10 Drawing Sheets

(51) Int. Cl.
*G06N 3/063* (2006.01)
*G10L 15/06* (2013.01)
*G10L 15/28* (2013.01)

(52) U.S. Cl.
CPC .......... *G10L 15/142* (2013.01); *G10L 15/285* (2013.01); *G10L 2015/0633* (2013.01)

(58) Field of Classification Search
CPC . G10L 15/22; G10L 15/30; G10L 2015/0635; G10L 2015/223; G10L 2025/786; G10L 25/87; G10L 15/08; G10L 15/14; G10L 15/16; G10L 15/285; G10L 15/142; G10L 15/06; G10L 2015/025
See application file for complete search history.

(56) References Cited

U.S. PATENT DOCUMENTS

| | | | |
|---|---|---|---|
| 6,549,945 B1 | 4/2003 | Sinibaldi et al. | |
| 7,027,988 B1 | 4/2006 | Mohri | |
| 7,069,215 B1 | 6/2006 | Bangalore et al. | |
| 7,209,880 B1 | 4/2007 | Gajic et al. | |
| 7,272,561 B2 | 9/2007 | Miyazaki et al. | |
| 8,352,265 B1* | 1/2013 | Lin | G10L 15/142 |
| | | | 704/256.6 |
| 8,463,610 B1* | 6/2013 | Bourke | G10L 15/197 |
| | | | 704/257 |
| 8,595,010 B2 | 11/2013 | Shields et al. | |
| 9,153,231 B1 | 10/2015 | Salvador et al. | |
| 9,633,669 B2* | 4/2017 | Salvador | G06F 3/165 |
| 10,176,802 B1* | 1/2019 | Ladhak | G10L 15/16 |
| 2008/0255839 A1 | 10/2008 | Larri et al. | |
| 2010/0169093 A1 | 7/2010 | Washio | |
| 2016/0066113 A1 | 3/2016 | Elkhatib et al. | |
| 2016/0093297 A1* | 3/2016 | Deisher | G10L 15/285 |
| | | | 704/236 |

OTHER PUBLICATIONS

PCT international Search Report of the ISA for PCT Application No. PCT/US2017/035134 dated Sep. 28, 2017; 5 pages.
PCT international Written Opinion of the ISA for PCT Application No. PCT/US2017/035134 dated Sep. 28, 2017; 5 pages.
Korean Office Action (with English Translation) dated Nov. 21, 2020 for Korean Application No. 10-2018-7036748; 8 pages.
Response (with Amended Claims in English) to Korean Office Action) dated Nov. 21, 2020 for Korean Application No. 10-2018-7036748; Response filed on Dec. 24, 2020; 18 pages.
Response (with English Translation/ with Amended Claims in English) to Korean Preliminary Rejection dated Mar. 30, 2020 for Korean Application No. 10-2018-7036748; Response filed on Jun. 26, 2020; 30 Pages.

* cited by examiner

LOW-POWER AUTOMATIC SPEECH RECOGNITION DEVICE

CROSS REFERENCE TO RELATED APPLICATIONS

This application is a U.S. National Stage of PCT application PCT/US2017/035134 filed in the English language on May 31, 2017, and entitled "LOW-POWER AUTOMATIC SPEECH RECOGNITION DEVICE," which claims the benefit under 35 U.S.C. § 119 of provisional application No. 62/344,081 filed Jun. 1, 2016, which application is hereby incorporated herein by reference.

RELATED APPLICATIONS

This application claims benefit of and priority to U.S. Provisional Patent Application No. 62/344,081 (filed Jun. 1, 2016), which is incorporated here by reference in its entirety.

FIELD

This disclosure relates to automatic speech recognition (ASR) and, more particularly, to ASR systems with low power consumption.

BACKGROUND

Since the late 1980s, there have been sporadic efforts to exploit special-purpose hardware for speech applications. Application-specific integrated circuits (ASICs) for hidden Markov Model (HMM) based speech recognition were reported as early as 1991, followed by power-conscious implementations intended for portable devices. The "In Silico Vox" project created sophisticated hardware ports of Sphinx-3, a well-established software framework for ASR.

More specialized research efforts have examined changes in ASR algorithms and their applicability to hardware. One area of evolution has been in the use of weighed finite-state transducers (WFSTs), which are a component of the modern ASR framework. WFSTs are now commonplace in software speech recognizers, including commercial systems. Perhaps due to long development cycles, most of the hardware implementations realized so far are based on non-WFST software decoders. Digital circuits using WFSTs were presented in 2008, contributing an important observation that pre-processing the WFST could eliminate the need to consider unlabeled arcs recursively during each frame.

Another focus area in ASR research has been acoustic modeling. Previous implementations of ASR hardware use Gaussian mixture models (GMMs) with varying levels of complexity (number of tied states and number of Gaussian components per distribution). To speed up computation, designers have performed frame skipping and Gaussian selection and used fixed-point parameters. Meanwhile, deep neural networks (DNNs) and other neural network architectures have become popular for ASR due to their improved accuracy. The circuits community has studied DNNs and developed efficient implementations, primarily for computer vision.

Other systems include various other architectural features: choosing how to divide hardware resources between acoustic modeling and search, and two-pass decoding with the first pass performed by hardware. Code generation tools can help rapidly evaluate different accelerator kernels specified in a high-level language. Acoustic models generally see large efficiency gains from acceleration, and front-ends generally do not, but there is no consensus on the proper hardware/software partitioning for search—this seems to depend on the application.

The wide range of algorithms available for voice activity detection (VAD) also provides opportunities to apply special-purpose architectures. Power can be minimized through a variety of techniques, whether minimum-energy operation in deeply scaled CMOS, or mixed-signal design with adaptive feature granularity. These efforts have brought VAD power consumption down to a few micro-Watts.

Other efforts in ASR have continued expanding decoder capabilities for general-purpose transcription applications with a 60,000 word (or larger) vocabulary, for example, achieving 127× faster than real-time throughput using a large ASIC clocked at 556 MHz. One system bridged the gap between high-performance and low-power applications, applying a series of optimizations to a Japanese-language system called Julius in order to obtain just 54 mW of power consumption and 82 MB/s of memory bandwidth during real-time decoding. Also, techniques of WFST pruning and search have been developed that are relevant to low-power ASR applications.

SUMMARY

Voice recognition has become ubiquitous in mobile computing, which requires low power to extend battery life. The automatic speech recognition (ASR) system described below may be capable of achieving real world power savings 90 to 99 percent greater than existing technologies.

The ASR system may include a continuous speech recognizer based on hidden Markov Models. It may transcribe an arbitrary length audio input into a sentence. The transition model may comprise WFSTs. In one test case, the ASR system had a vocabulary of 145k words and required under 8 milli-Watts for operation. In another test case, the ASR system used a vocabulary of eleven words and required 172 micro-Watts for operation.

In an embodiment, a decoder comprises a feature extraction circuit for calculating one or more feature vectors; an acoustic model circuit coupled to receive one or more feature vectors from said feature extraction circuit and assign one or more likelihood values to the one or more feature vectors; a memory for storing states of transition of the decoder; and a search circuit for receiving an input from said acoustic model circuit corresponding to the one or more likelihood values based upon the one or more feature vectors, and for choosing states of transition from the memory based on the input from said acoustic model.

One or more of the following features may be included.

The memory may be an on-chip cache memory.

The states of transition may comprise a weighted finite state transducer (WFST).

An integrated circuit may implement the feature extraction circuit, acoustic model, memory, and search circuit.

The cache memory may be provided as a circular memory configured to operate with variable length blocks.

The acoustic model circuit may be provided as a deep neural network (DNN).

The feature extraction circuit, acoustic model circuit and search circuit may operate in accordance with a parallelization technique.

A voice activity detection circuit may be configured to provide power to one or more of the feature extraction circuit, acoustic model circuit, and search circuit upon detection of voice activity.

The search circuit may comprise a consolidated state list comprising two state lists.

The search circuit may rely on epsilon arc processing of a weighted finite state transducer (WFST) to avoid the need for recursion.

A reconfigurable neural network (NN) evaluator architecture may be included.

The reconfigurable NN evaluator architecture may comprise a plurality of execution units that are configured to be enabled or disabled based on neural network size.

The execution units may be configured to access a variable number of SRAM memories based on neural network size.

In another embodiment, a method of automatic speech recognition includes: evaluating a deep neural network (DNN) acoustic model across multiple frames in parallel during a single transfer of the DNN parameters; training the DNN with layers having a comparable number of nodes; compressing the weight matrix for each DNN layer with a scalar quantizer; using on-chip caching to reduce external memory accesses for search graph (WFST) parameters; constructing an on-chip lattice of states which represents word hypotheses by performing an on-chip conversion to a word lattice structure which is much smaller.

One or more of the following features may be included.

The weight matrix for each layer may be compressed with a scalar quantizer comprises compressing the weight matrix for each layer with a scalar quantizer having a range of 6-10 bits.

The DNNs may be trained with sparse weights for further memory savings.

Training the DNN with all layers may include the output layer having a comparable number of nodes to maximize on-chip memory utilization.

Using on-chip caching to reduce search graph (WFST) parameters may include using the on-chip caching to reduce bandwidth by using a circular buffer architecture.

Using on-chip caching to reduce search graph (WFST) parameters may include using the on-chip caching to reduce bandwidth by using a non-standard circular buffer architecture to cache objects of variable size.

The WFST may be compressed with an application-specific encoding to maximize hit rates and minimize the bandwidth required for cache misses.

A lattice of states may be constructed which represents word hypotheses identified by a Viterbi search algorithm.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like numbers in the figures denote like elements.

DETAILED DESCRIPTION

Figure 1:
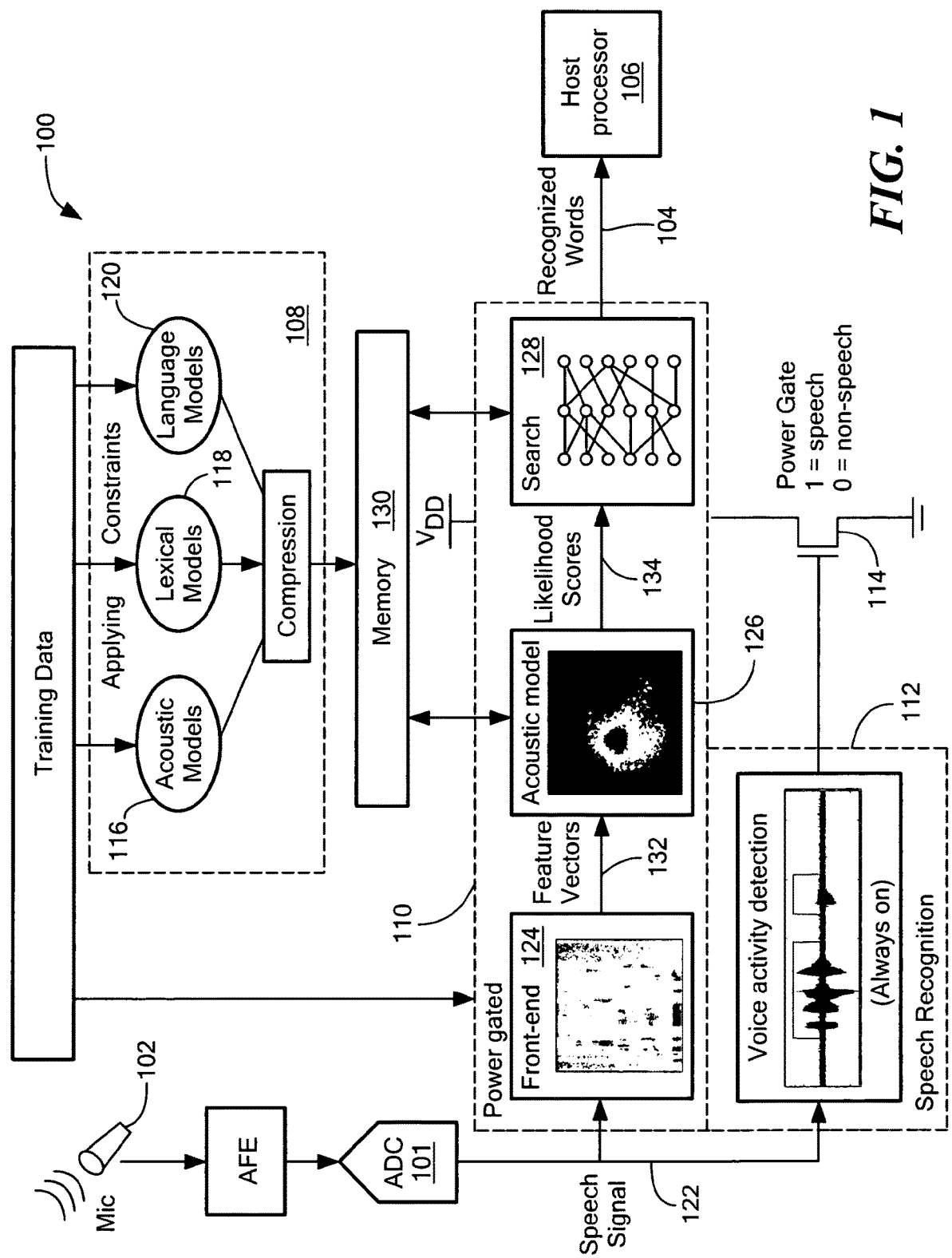
FIG. 1 is a block diagram of a system for speech recognition.

FIG. 1 is a block diagram of an acoustic speech recognition (ASR) system 100. ASR system 100 receives audio data from microphone or other transducer 102 (which may be converted to a digital signal by a processing device such as analog-to-digital converter (ADC) 101) as input and produces recognized words 104 as output. The output may be received by host processor 106, which may be a computer, mobile computing device, computer processor chip, or other computing device.

ASR system 100 may include a modeling module 108 that provides model data for ASR system 100. Modeling module 108 may include acoustic models 116, lexical models 118, and/or language models 120. ASR system 100 may also include a compression module 130 to compress data, such as a DNN weight matrix for example, from the models 116, 118, and/or 120. In embodiments, the compression module may compress the data using a scalar quantizer, which may have a precision range of 6-10 bits. Those of ordinary skill in the art will appreciate how to determine the precision required to meet the needs of a particular application. The DNN may also be trained with sparse weights for further memory savings. Additionally, the DNN may be trained where the layers of the DNN each have a comparable number of nodes to maximize on-chip memory utilization.

ASR system 100 may include an ASR module 110 (which may be an ASR decoding module), having a front-end module 124, acoustic model module 126 (which may be an acoustic model evaluation module), and search module 128 to process speech signal 122 from microphone 102 (or from another type of audio source).

One or more of the modules and components of ASR system 100 may be coupled and decoupled to power by through the operation of an automated power gate 114. In the example embodiment of FIG. 1, power gate 114 is illustrated by a MOSFET symbol connecting ASR module 110 to ground. However, any type of switch may be used that can couple and decouple elements of system ASR 100 to power or ground.

ASR system 100 may also include a voice activity detection circuit 112. Voice activity detection circuit may be coupled to receive speech signal 122. In response to receiving speech signal 122, voice activity detection circuit 112 may control power gate 114. For example, if voice activity detection circuit 112 does not detect speech or audio for a predetermined amount of time, it may cause power gate 114 to disconnect ASR module 110 from power to reduce power consumption. When voice activity detection circuit 112 detects speech or audio, it may cause power gate 114 to couple ASR module 110 to power to process the speech or audio.

ASR system 100 may also include memory 130. Memory 130 may be shared between model module 108 and ASR module 110, and may act as storage area for data communicated between model module 108 and ASR module 110 and data produced by ASR module 110 during operation.

In embodiments ASR system 100 may be implemented as, or as part of, a signal processing integrated circuit (IC). The IC may provide low power consumption. In one implementation, the IC may include ASR module 110 and/or voice activity detection module 112, while memory 130 and model module 108 are external to the IC.

Front-end module 124 may transform audio (e.g. 16-bit samples at 8 kHz or 16 kHz) into a lower-rate feature representation. For example, front-end module 124 may produce feature vectors 132, which may be based on mel-frequency cepstral coefficients (MFCCs). In one embodiment, the MFCC features may be based on 25 ms frames of audio with 10 ms intervals between frames.

Acoustic module 126 receives feature vectors 132 and produces likelihood scores 134 based on feature vectors 132 and data received from model module 108. Search module 128 receives likelihood scores 134 and uses them to recognize which word(s) were spoken in speech signal 122. Search module 128 produces a signal representing the recognized words 104.

In embodiments, acoustic model 126 and/or search module 128 may be implemented, in whole or in part, as hidden Markov model (HMM) inference, where hidden variables are states within a Markov process modeling speech production, and the observed variables are the acoustic features (e.g. feature vectors 132). Additionally, search module 128 may implement the Viterbi search algorithm. The Viterbi algorithm maintains a list of hypotheses, or active states, at each time step (e.g. each iteration of the algorithm). It also approximates the likelihood of all reachable states at the next time step.

Figure 3:
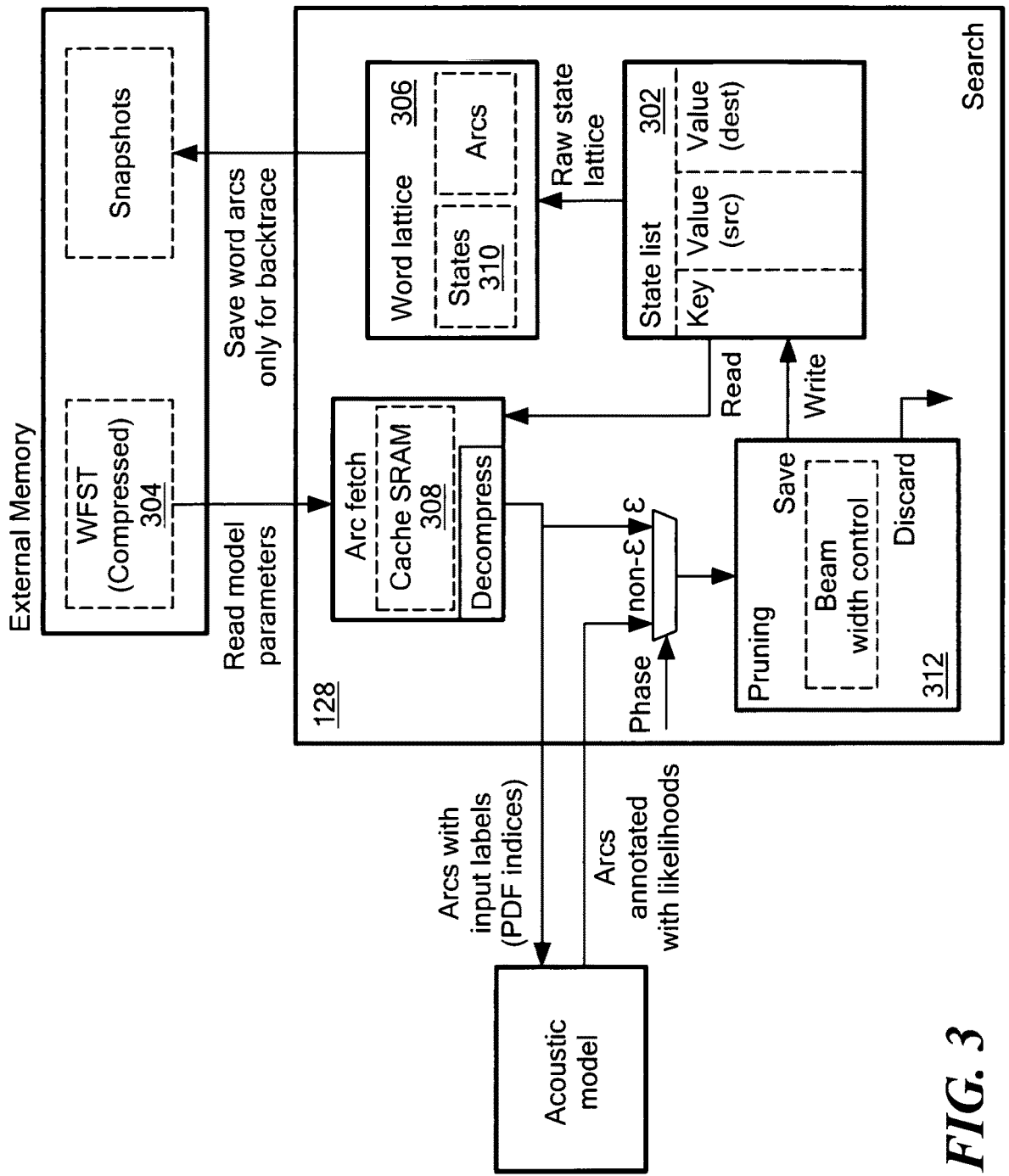
FIG. 3 is a block diagram of a search module.

In embodiments, an active state list may be stored in an on-chip memory (e.g. memory 302 in FIG. 3). The active state list may represent all or a subset of states of a weighted finite-state transducer for a particular language, lexical, and/or acoustic model of ASR system 100. The Viterbi algorithm may operate on the active state list to determine the next likely states in the received speech. The Viterbi algorithm may also use a beam search, in which less-likely hypotheses are discarded to save processing time and power.

Acoustic Modeling

The acoustic model evaluates the likelihood of input features $y_t$ with respect to a set of distributions $p(y|i)$, where i is the index of a tied state. In an embodiment, acoustic model 126 implements a deep-neural network (DNN) model. However, other models may be used including, but not limited to Gaussian mixture models (GMMs), recurrent networks (RNN), convolutional networks (CNN), long short-term memory cells (LSTM), subspace GMM (SGMM), or a combination thereof.

Figure 2:
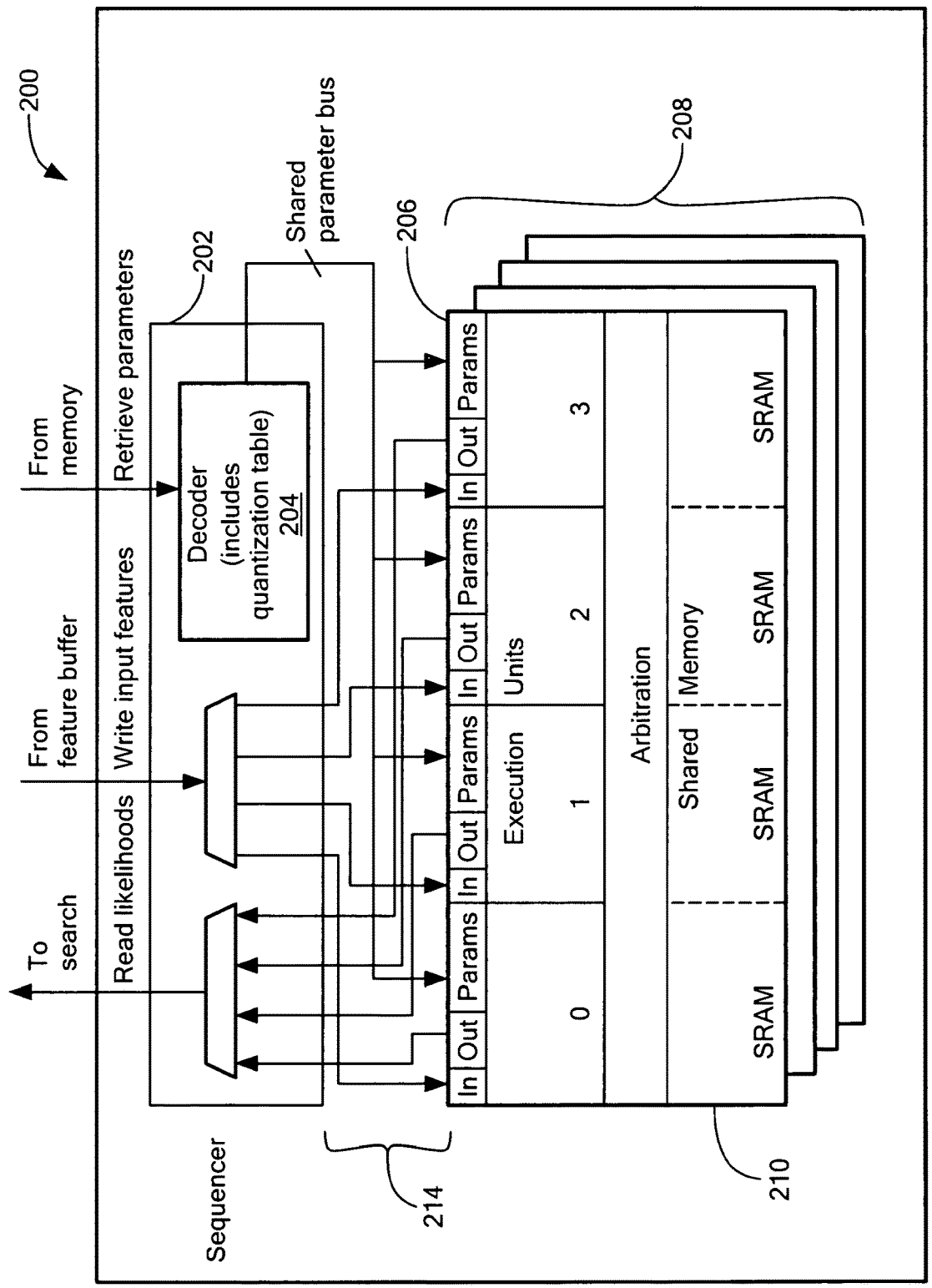
FIG. 2 is a block diagram of an acoustic model module.

Referring to FIG. 2, an architecture 200 for evaluation of a neural network (NN) acoustic model is shown. In embodiments, architecture 200 may implement a DNN. The architecture shown is a single-instruction/multiple-data (SIMD) architecture. However, other architectures may also be chosen for evaluating the NN.

Architecture NN includes a sequencer 202 that receives a compressed parameter stream from memory 130. Decoder 204 decodes the compressed parameters and sends weight and bias coefficients to one or more execution units (EUs) 206. Each EU may include a local memory for storing feature vectors received from front-end module 124, intermediate results, and likelihood outputs for one frame. Thus, to reduce power consumption, only the network parameters are fetched from off-chip memory 130, and no data is written to memory 130.

To provide scalability, architecture 200 may be reconfigurable. For example, EUs 206 may be organized into groups, such as group 208 of four EUs. Each group may arbitrate access to a group of SRAM memories 210. For small neural networks, each EU 206 may be active and accessing one SRAM. For larger networks that would overflow one SRAM 210, every other EU 206 may be disabled and the active EUs may access two adjacent SRAMs 210. Similarly, for neural networks that are large enough to overflow two SRAMs, three of every four EUs 206 may be disabled and the active EUs are configured to access four adjacent SRAMs.

In an embodiment, ASR system 100 may include thirty-two EUs organized into eight groups of four. In additional, each EU may have one single-port SRAM 210 that stores both input and output vectors of the current layer. This may result in a reduction of memory bandwidth and clock frequency. The grouping scheme can also be expanded to handle a wider range of neural networks if required.

Model data structures stored in memory 130 may be designed so the entire model may be accessed with a single, sequential read to avoid page access penalties and also reduce bandwidth and power consumption from reading memory 130.

In embodiments, acoustic model 116 may be designed so that the model, when compressed and stored in memory 130, is about 1 megabyte in size. This may reduce memory access to limit power consumption, while still providing a sufficiently accurate acoustic model.

Certain embodiments work in concert with model design to provide about two orders of magnitude in energy scalability across different ASR tasks. The time required to evaluate a NN model is dominated by the matrix/vector multiplications in affine layers, which grows with the square of the layer width (number of nodes). Furthermore, the maximum layer width dictates the amount of parallelism that is possible. Thus, the overall computation time (and, to a first approximation, energy) grows with the cube of the network width.

Circuit area may scale linearly with the number of EUs. This creates an area/power tradeoff: having more EUs allows lower memory bandwidth, and slightly lower core power due to reduced clock frequencies and voltages. Worst case latency may be proportional to the number of EUs, since search cannot proceed until the acoustic model is evaluated. With 32 EUs, the acoustic model occupies 44% of total ASR area. Circuit area may also scale linearly with the amount of memory provided to each EU. In addition, the user can limit the number of frames evaluated by acoustic model 126 through software settings in a host system, for example. This may increase amortized memory bandwidth and runtime, but decrease latency.

Sequencer and EU

The interface 214 between sequencer 202 and EUs 206 may include a first-in-first-out (FIFO) command module and a FIFO data module. In embodiments, each EU has minimal control logic and instead executes commands from sequencer 202 on data in memory, similar to an arithmetic-logic unit (ALU). In embodiments, each active EU may manipulate a vector corresponding to one acoustic frame, and store the vector in its local memory.

Figure 2A:
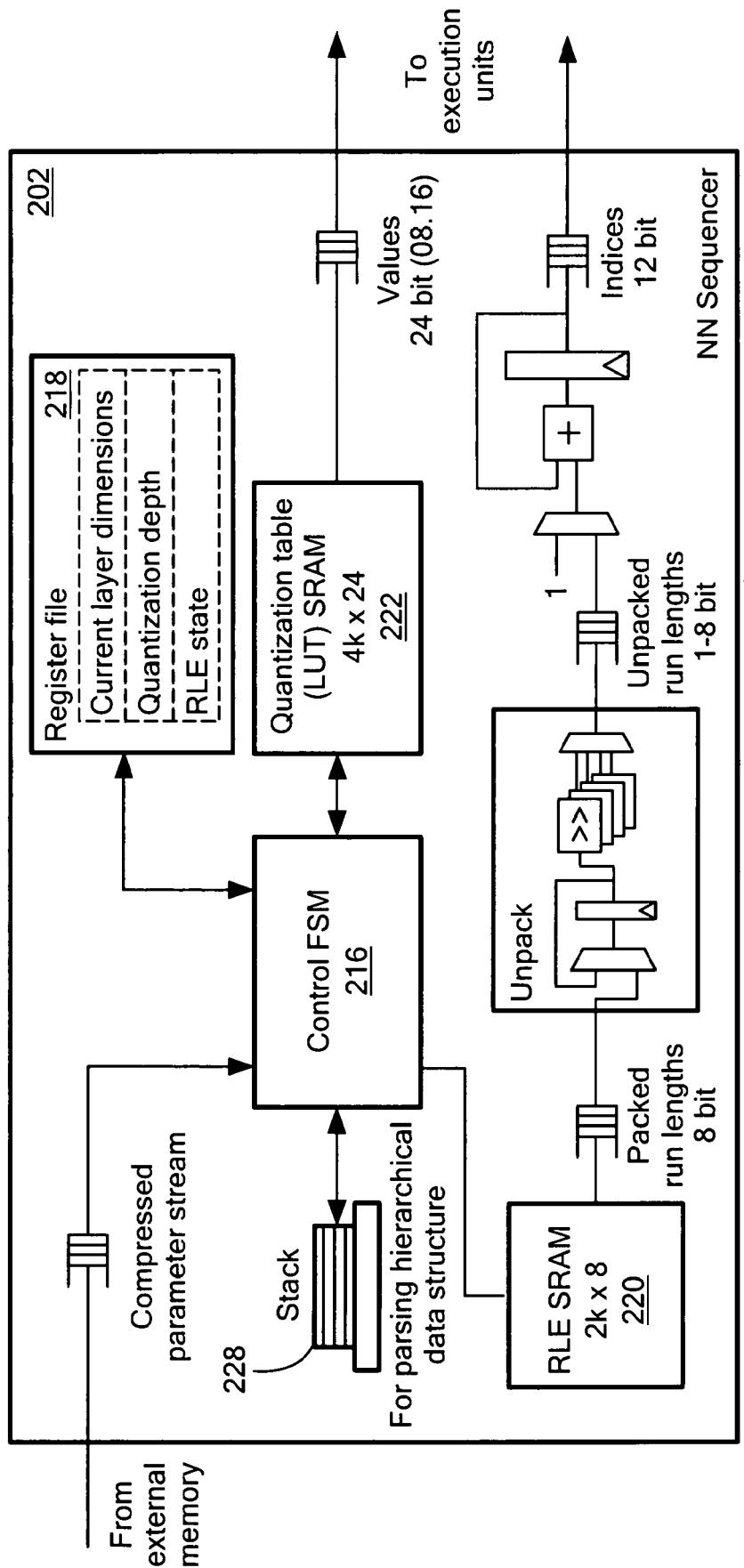
FIG. 2A is a block diagram of a sequencer.

FIG. 2A is a block diagram of an architecture of sequencer 202 (FIG. 2). Sequencer 202 may include a control block 216 coupled to a register file 218, a stack 228 for parsing hierarchical data structures, an SRAM, and a quantization table SRAM 222. Sequencer 202 interprets compressed parameter stream 224 from external memory 130. In some embodiments, it interprets compressed parameter stream 224 at a rate of one byte per clock cycle. Other embodiments may, of course, use a different number of bytes per clock cycle.

Compressed parameter stream 224 may have a hierarchical format that can be parsed via stack 228. An NN represented by this format is a list of layers. Each layer can be specified in either sparse or dense form. Both forms include a bias vector and quantized weight matrix. Each weight matrix has its own quantizer to account for different distributions of weights without loss of accuracy. As the parameter stream is streamed in, quantizer levels may from the stream may be stored in quantization table SRAM 222. In a dense layer, the next structure in the stream may be a bit-packed group of quantizer indices. Sequencer 202 may read each quantizer level from quantization table SRAM 222 and pair them with serially incremented indices. In such an embodiment, the sequencer may instruct the EUs to perform matrix/vector multiplication in row-major order. Sparse layers may contain additional structures to improve compression, which can be parsed by sequencer 202.

Figure 2B:
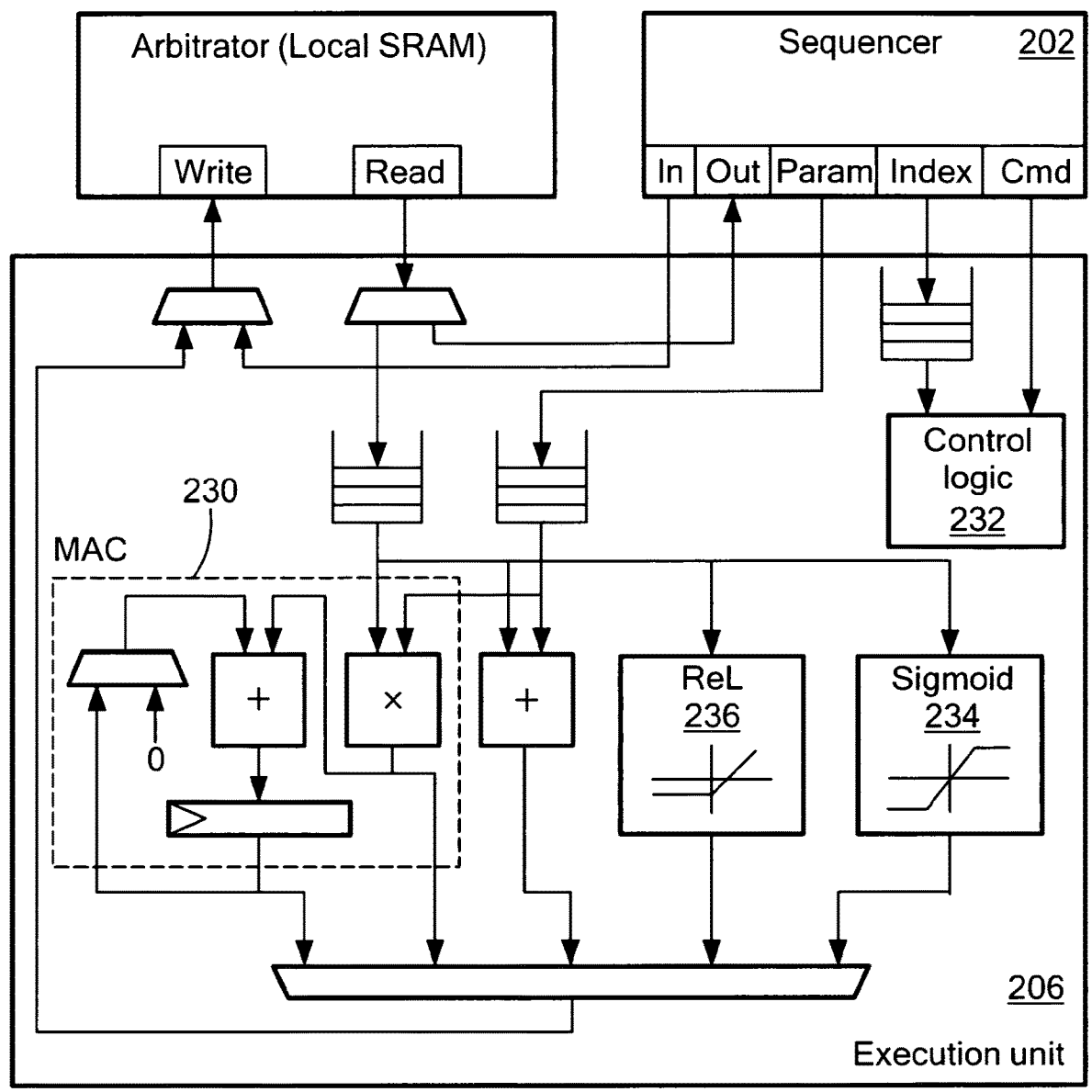
FIG. 2B is a block diagram of an execution unit.

FIG. 2B is a block diagram of an architecture of EU 206. Each EU 206 may include circuits to perform arithmetic functions such as addition, multiplication, matrix/vector operations, etc. In embodiments, EU 206 may include a multiply/accumulate (MAC) module 230 for matrix and vector operations. MAC module 230 may be a 24-bit MAC. EU 206 may also include a sigmoid module 234 and/or rectified linear (ReL) module 236. In embodiments, sigmoid module 234 may perform an approximation of the sigmoid function so as to save circuit area and power. Control logic module 232 may determine which memory location to read, which arithmetic operation to perform, and which memory location to write the result, based on the instruction received from sequencer 202.

Search

FIG. 3 is a block diagram of search module 128 (see FIG. 1). In an embodiment, search module 128 may be configured to perform Viterbi search with limited local memory. In embodiments, the module has two state lists 302 with a pipeline of processing stages in between. One list may contain the state hypotheses for frame t and the other list may contain the state hypotheses for frame t+1. Pipeline stages can be separated by FIFOs (not shown) to keep each stage operating at high utilization despite variable latency.

At the beginning of the utterance, a starting state (i.e., state 0) with a likelihood of 1 may be inserted, followed by all the other initial states of the WFST 304 that are reachable via ε arcs from the starting state.

A forward pass of Viterbi search may be performed at each time step (frame). At the beginning of the forward pass, the state list for frame t+1 may be empty. Each state from frame t may be read and the WFST may be queried for arcs leaving that state. The destination of each arc may be another state which becomes a hypothesis for frame t+1. The likelihood of these new hypotheses may include the likelihood of being in the source state, the transition probability (arc weight) from the WFST 304, and the acoustic likelihood for the appropriate tied state distribution (arc input label). Following the Viterbi approximation, only the most likely arc into each state is considered for selecting and scoring hypotheses, where $p(x_{t+1})$ is approximated as $\max_{x_t} p(x_t) p(x_{t+1}|x_t) p(y_{t+1}|x_{t+1})$, where $x_t$ is the index of a WFST state considered by the search at time t and $y_t$ is the feature vector representing the audio signal at time t.

The forward pass may be divided into two phases: the "non-ε" phase and the "ε" phase. In the non-ε phase, the source states from frame t may be expanded. However, in embodiments, only the arcs with non-ε (nonzero) input labels are considered. The ε-input arcs may be discarded because they do not advance the hypothesis forward in time. Each non-ε arc may be scored with a likelihood from the acoustic model, and the destination states with sufficiently high scores may be saved as hypotheses for frame t+1. Then, in the ε phase, all the source states from frame t+1 may be expanded. Only the ε-input arcs are considered, so the acoustic model may not be required. High-scoring arcs may be saved as hypotheses for frame t+1 (i.e. they do not advance forward in time). To eventually recover the word sequence, the list of active states may be saved after each forward pass (as a "snapshot" to external memory 130).

Figure 4:
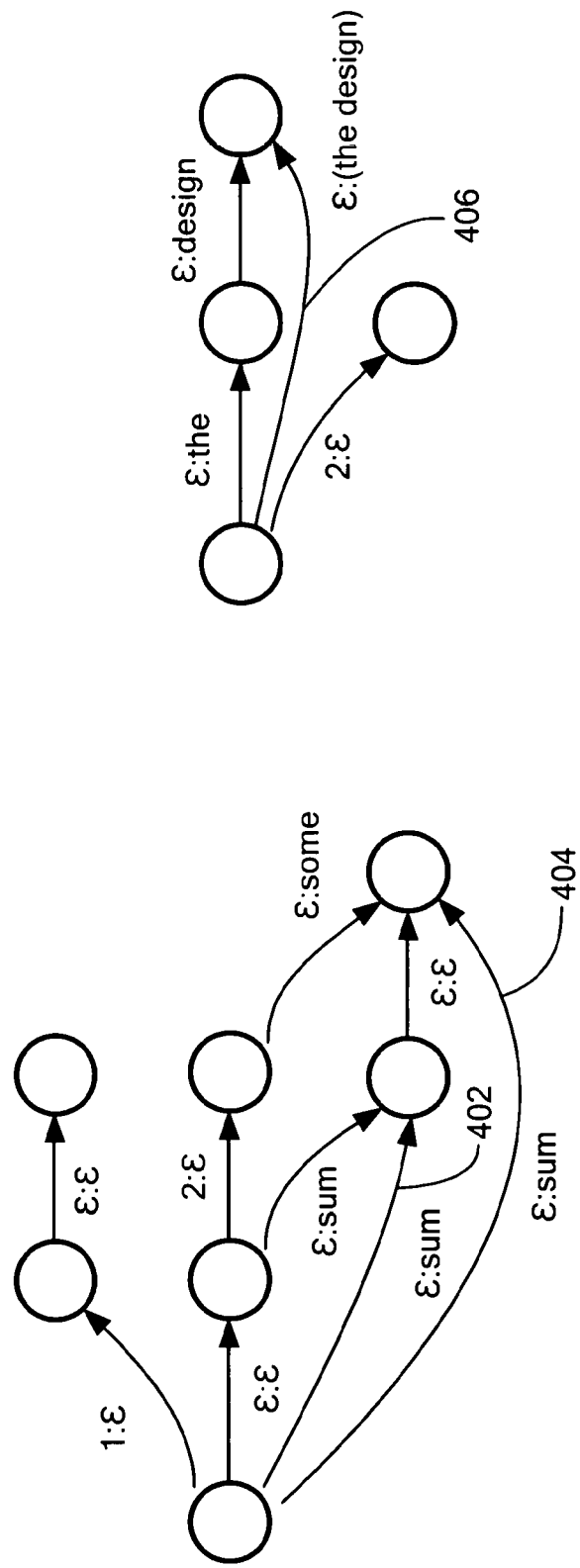
FIG. 4 is a diagram of WFST transformations to remove the need for recursion.

Referring to FIG. 4, because the same set of states (frame t+1) are read, there is the potential of infinite recursion. The WFST is processed so that all paths consisting of only ε arcs are bypassed by a single ε arc having the same total weight. Some paths, such as paths 402, 404, and 406, may traverse multiple arcs with non-ε output labels, so multi-word output symbols may be created as necessary to bypass these paths, as shown in FIG. 4. The system records whether each state in frame t+1 was originally added in the non-ε phase or the ε phase. If it was added in the ε phase, the state is not expanded during the ε phase. This may be possible because all states that are reachable at frame t+1 were reachable via a single ε arc from a state that was added in the non-ε phase.

After the audio has been consumed to create feature vectors, and the feature vectors have been consumed by forward search, a final weight update may be performed. This involves reading all stored states and adding final weights from the WFST to their likelihood scores. In embodiments, not all states have a final weight (or, equivalently, their final weight may be infinite). In an embodiment, if any of the states have a final weight, then only those are considered as valid endpoints of the search. If none of the states have a final weight, then all are considered valid. The most likely valid state is used as the endpoint for a backtrace which produces a sequence of word labels. This backtrace could be constructed by reading all of the state snapshots (stored in external memory) in reverse order, for example.

In embodiments, efficiency features can be added to search module 128 without changing the behavior of the search algorithm. For memory area savings, the two state lists 302 may be consolidated into a single list with separate fields for the "source" (t) and "destination" (t+1) frames. This may be beneficial because most states remain active for several frames at a time. More significant optimizations may be made to reduce off-chip memory bandwidth. WFST compression and caching techniques may be used to reduce read bandwidth, and a word lattice may be used to reduce write bandwidth.

Referring again to FIG. 3, keeping state list 302 and arc fetch cache 308 within search module 128, i.e. within local memory or local memories within search module 128, provides a benefit to energy efficiency and convenience. Using these local memories allows the architecture to avoid having a shared memory that connects to every module. Instead, each module has a local memory for just the information needed by the module. By using state list 302 and arc fetch cache 308, dependency on external memory may be reduced to only two activities: fetching the WFST and reading/writing the word lattice 306.

In embodiments, state list 302 may be a hash table that stores active states (i.e. hypotheses for the speech recognition). Each hypothesis may be indexed by a particular WFST state and linked with a (state, time) pair referred to as a word lattice state (WL state) 310.

As the compressed WFST data is received, it is expanded by the arc fetch module 308 to produce a sequence of arcs. Each arc that is expanded has a destination state, input and output labels, and weight.

Prior to the search being executed, the acoustic model has a computed likelihood for each tied state. For each unscored arc, the appropriate likelihood is received and combined with the source state score and arc weight to achieve the overall likelihood of the destination state. The scored arc has enough information necessary to save a new hypothesis in the state list. However, if the score of the arc does not exceed a particular threshold, the arc may be pruned and discarded by pruning module 312. If the scored arc has a word label (i.e. a non-ε output label), it may be sent to word lattice 306.

Figure 5:
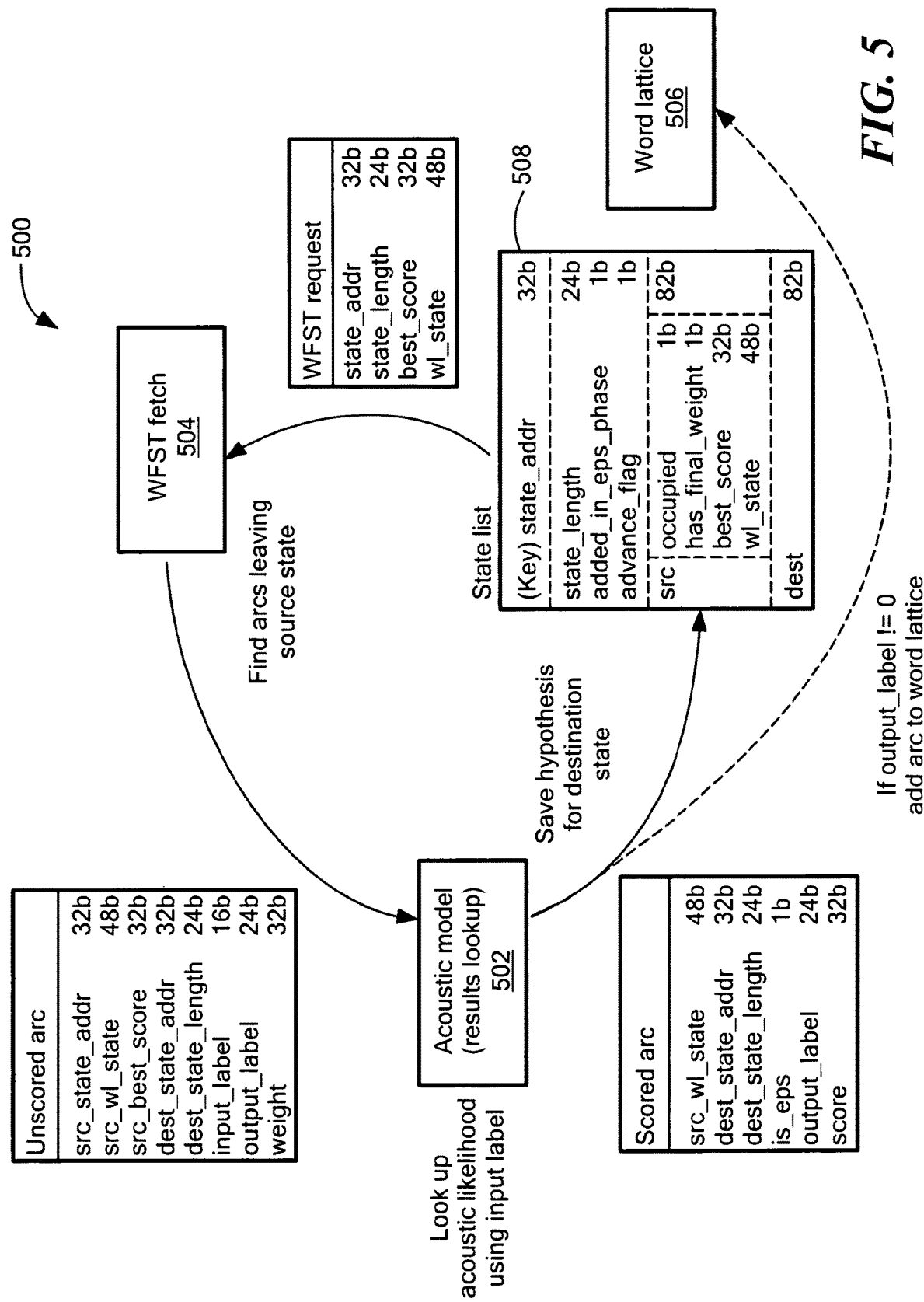
FIG. 5 is a diagram of data structures transferred through a search pipeline.

Referring to FIG. 5, a diagram of a state machine 500 illustrates the state logic for ASR module 110. State machine 500 may perform a sequential scan (e.g. reading frame t states) while performing reads, inserts, and updates of frame t+1 states. If the state list hash table 302 is expanded, the scan may be restarted to ensure all frame t states are read and processed. A pruning operation may delete states from frame t+1 if the associated likelihood of those states falls below a predetermined threshold. As each pass of state machine 500 is completed, an advance operation is performed that moves information from the frame t+1 states into frame t. If a state is present in frame t, but not frame t+1, this may indicate that the state is no longer active in the search. Such states may be deleted.

WFST

The WFST contains time-varying aspects of the HMM. In embodiments, the WFST is a composition of four training sources: the lexicon (phoneme sequences that make up each word), the language model (possible transitions between words), the subphonetic model (different sounds produced over time within each phoneme), and the context dependency (different ways of realizing each phoneme). The information may be stored in the WFST using a key/value store where keys are state IDs and the values contain all outgoing arcs from each state. The arcs may include a weight which can be used during processing of hypothesis likelihoods. In embodiments, the WFST data may be trained with quantized weights for memory savings.

The WFST may be cached to reduce memory access and bandwidth. The cache may also be compressed. Because each object in the WFST may have varying size (due to different numbers of possible arcs leaving each state), the objects may be stored as variable length sequences of bytes in the cache, rather than using a one-arc-per-cache-line scheme. Additionally, the cache may have a circular buffer architecture. The circular buffer may be configured to allow for the variable-size objects. This may reduce cache misses and flushes/evictions of data from the cache.

In some embodiments, the WFST may be encoded and/or compressed with an application-specific encoding scheme to maximize hit rates and minimize the bandwidth for cache misses.

Word Lattice

Figure 6:
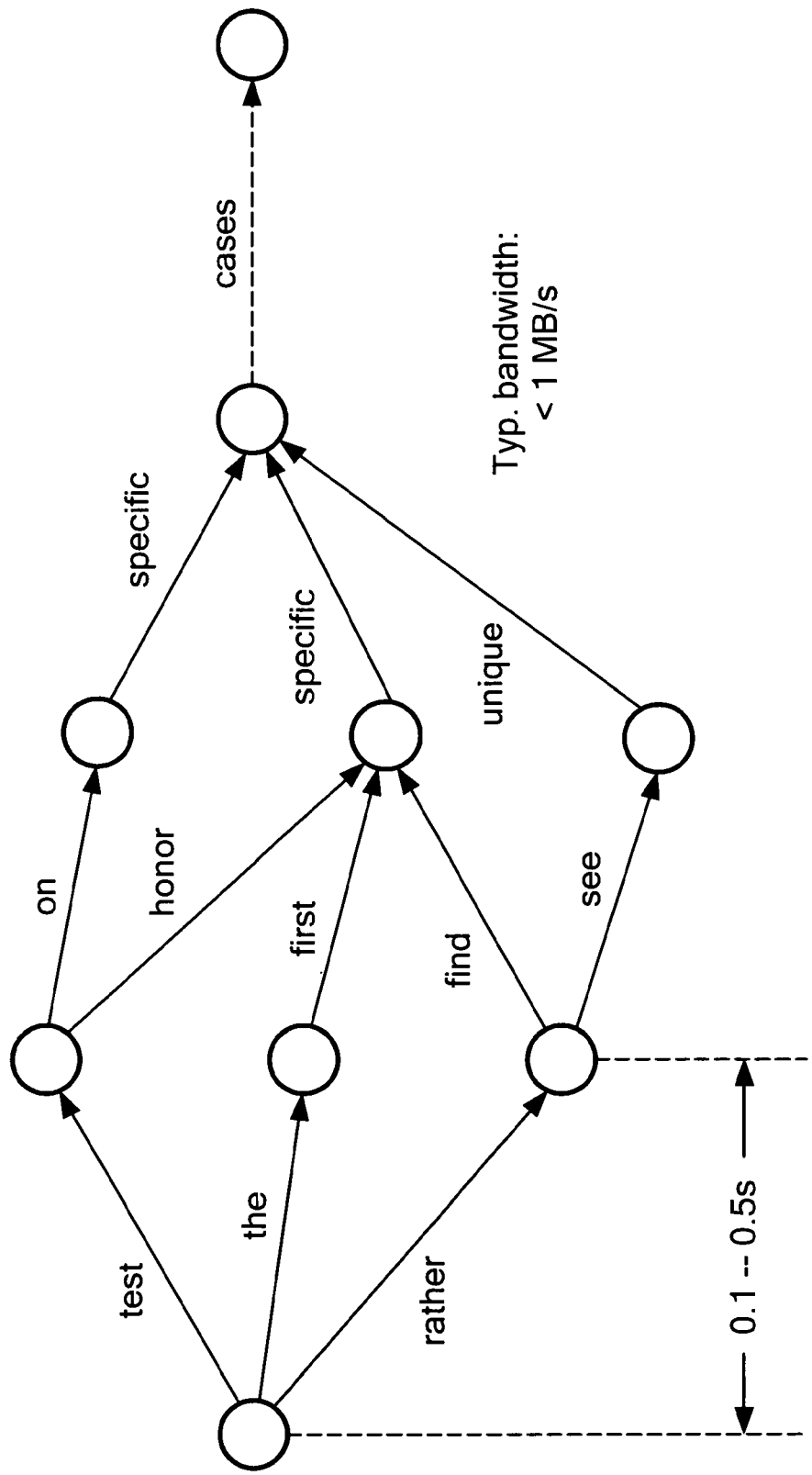
FIG. 6 is a diagram of a word lattice.

Referring to FIG. 6, ASR module 110 may include an on-chip word lattice 600 to reduce the reading and writing of search hypothesis data to external memory. In embodiments, the Viterbi search may generate the equivalent of a state lattice, identifying possible trajectories through the states of the WFST. Because on-chip memory may be limited, it may be sufficient only for a small number of frames, for example two frames. Thus, the state list may be saved to external memory after each forward pass, in what may be referred to as a snapshot.

The snapshot may vary in size but may typically be 10-50 kB. This may result in an average 1-5 MB/s of writes. At the end of decoding, all the snapshots can be read in reverse order to perform a back-trace, resulting in an additional 1-5 MB/s amortized read bandwidth. At least some of the information in the state snapshots may not be necessary for reconstructing word-level hypotheses.

Figure 6A:
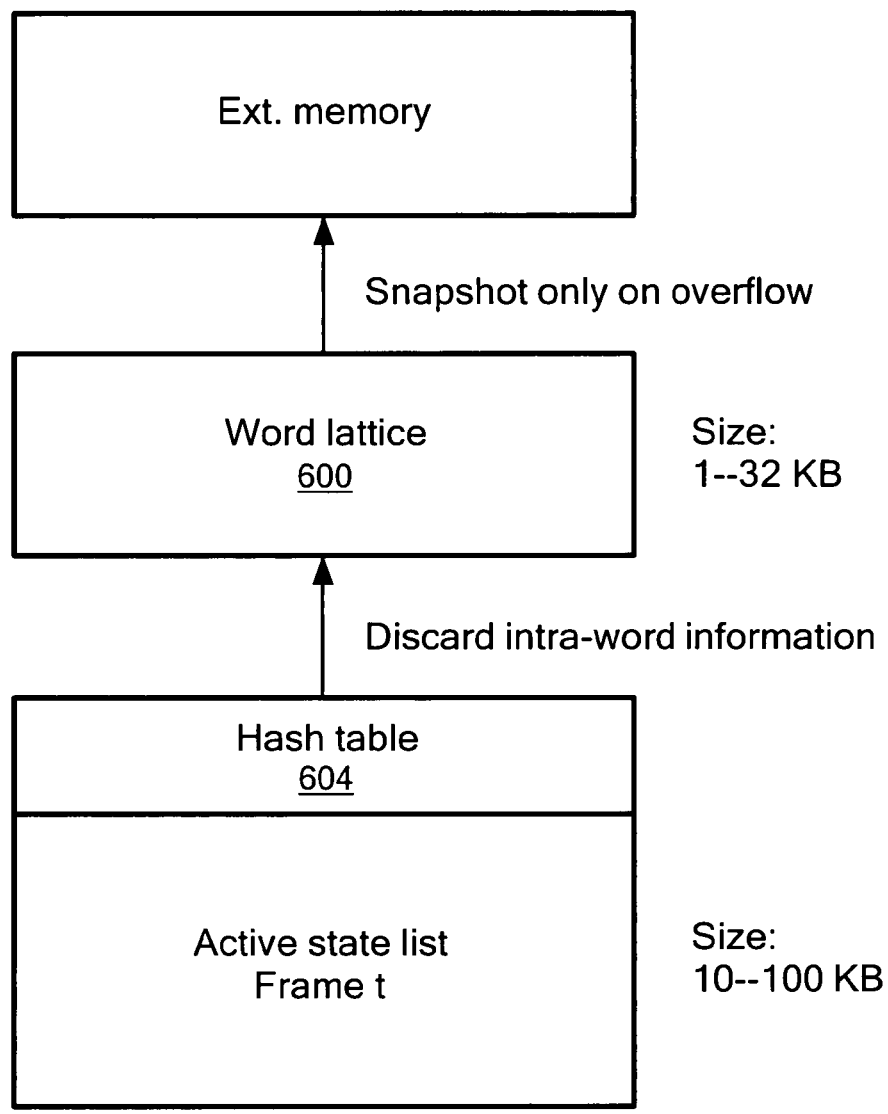
FIG. 6A is a block diagram of word lattice storage.

A word lattice differs from a state lattice in that every arc may have exactly one output (word) label. Each arc in the word lattice may represent a chain of one or more arcs in the state lattice, the last of which has an output label. Because the word lattice may be smaller than a state lattice covering the same search space, snapshots to the external memory are needed less frequently. FIG. 6A illustrates an example of storing a snapshot of word lattice 600 from state hash table 604 to external memory.

For example, data structures such as those shown in FIG. 6 and FIG. 6A, may be used by the word lattice. In embodiments, the word lattice consists of a hash table for storing states, and a flat array for storing arcs. States and arcs may be stored separately because there can be multiple arcs leading into any state, representing alternative word hypotheses.

Figure 7:
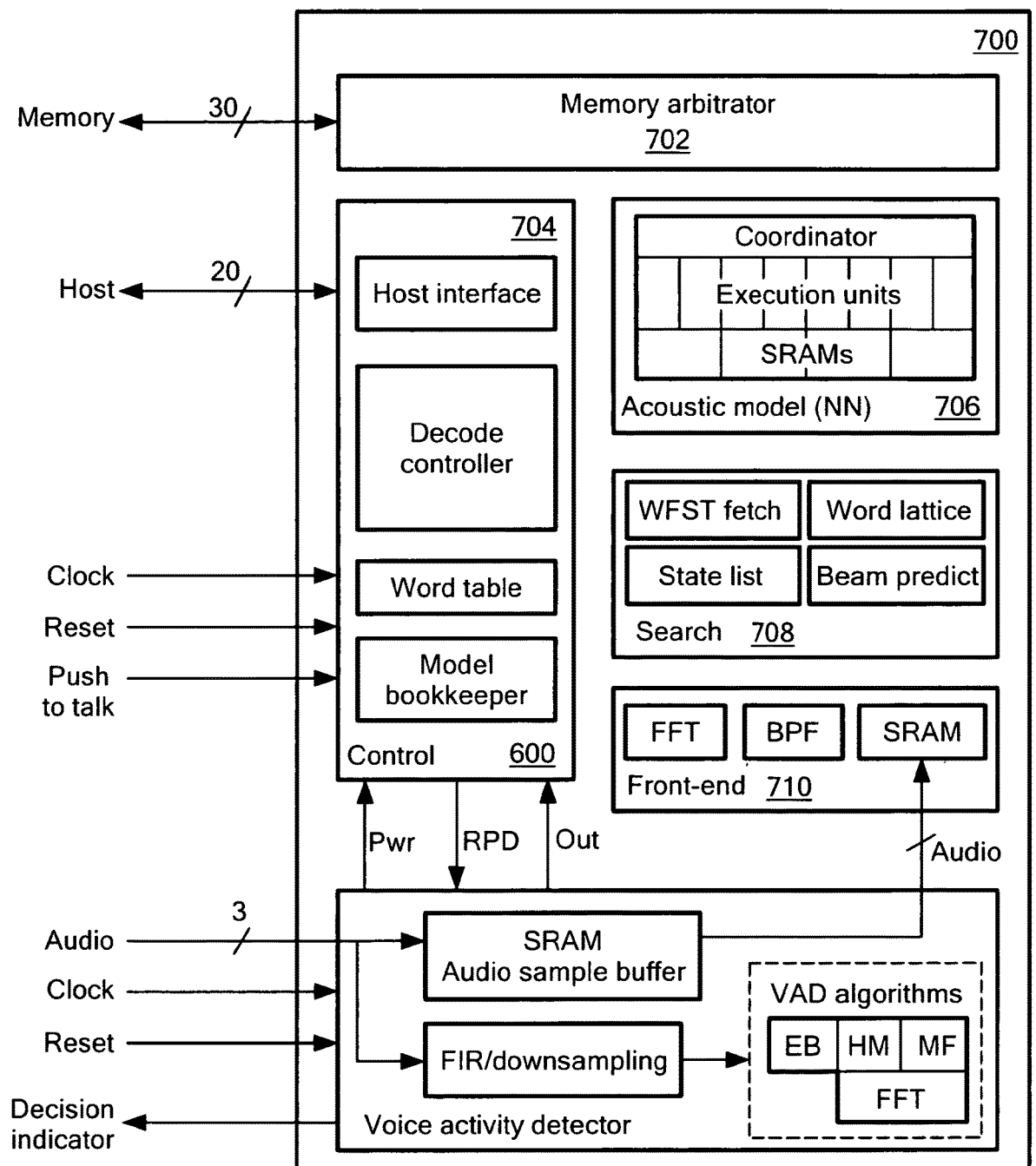
FIG. 7 is a block diagram of a chip-implementation of a system for speech recognition.

Referring to FIG. 7, integrated circuit (IC) 700 may implement some or all of ASR module 110 (see FIG. 1). IC 700 may include a memory arbitrator 702 to provide and control access to external memory 130, and a control circuit 704 to control operation of the IC. IC 700 may also include acoustic model module 706, which may be the same as or similar to acoustic model module 126, and which may perform the acoustic module functions described above. IC 700 may also include search module 708, which may be the same as or similar to search model 128, and which may perform the search module functions described above. Also, front-end module 710 may be the same as or similar to front-end module 124, and may perform the frond-end functions described above. VAD circuit 712 may be the same as or similar to VAD circuit 112 and may perform the VAD circuit functions described above. IC 700 may provide significant power savings in comparison to traditional ASR systems, and may be suitable for mobile applications or other applications where low power consumption is beneficial.

Details related to ASR systems may be found in the dissertation of Michael Price, Energy-scalable Speech Recognition Circuits (June 2016) (on file with the Massachusetts Institute of Technology Libraries), which is incorporated here by reference in its entirety.

Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims. All references cited herein are hereby incorporated herein by reference in their entirety.

The invention claimed is:
1. A decoder comprising:
a feature extraction circuit for calculating one or more feature vectors;
an acoustic model circuit coupled to receive one or more feature vectors from said feature extraction circuit and assign one or more likelihood values to the one or more feature vectors;

a memory for storing states of transition of the decoder; and a search circuit for receiving an input from said acoustic model circuit corresponding to the one or more likelihood values based upon the one or more feature vectors, and for choosing states of transition from the memory based on the input from said acoustic model circuit by performing a Viterbi search on an active state list, wherein a state lattice generated by the search is converted to an on-chip word lattice, wherein an arc in the word lattice represents a chain of one or more arcs in the state lattice.

2. The decoder of claim 1 wherein the memory is an on-chip cache memory.

3. The decoder of claim 1 wherein the states of transition comprise a weighted finite state transducer (WFST).

4. The decoder of claim 1 comprising an integrated circuit implementing the feature extraction circuit, acoustic model, memory, and search circuit.

5. The decoder of claim 1 wherein said cache memory is provided as a circular memory configured to operate with variable length blocks.

6. The decoder of claim 1 wherein the acoustic model circuit is provided as a deep neural network (DNN).

7. The decoder of claim 1 wherein said feature extraction circuit, acoustic model circuit and search circuit operate in accordance with a parallelization technique.

8. The decoder of claim 1 further comprising a voice activity detection circuit configured to provide power to one or more of the feature extraction circuit, acoustic model circuit, and search circuit upon detection of voice activity.

9. The decoder of claim 1 wherein the search circuit comprises a consolidated state list comprising two state lists.

10. The decoder of claim 1 wherein the search circuit avoids recursion via epsilon arc processing of a weighted finite state transducer (WFST).

11. The decoder of claim 1 further comprising a reconfigurable neural network (NN) evaluator architecture.

12. The A decoder of claim 11 comprising:

a feature extraction circuit for calculating one or more feature vectors;

an acoustic model circuit coupled to receive one or more feature vectors from said feature extraction circuit and assign one or more likelihood values to the one or more feature vectors;

a memory for storing states of transition of the decoder;

a search circuit for receiving an input from said acoustic model circuit corresponding to the one or more likelihood values based upon the one or more feature vectors, and for choosing states of transition from the memory based on the input from said acoustic model; and a reconfigurable neural network (NN) evaluator architecture, wherein the reconfigurable NN evaluator architecture comprises a plurality of execution units that are configured to be enabled or disabled based on neural network size.

13. The decoder of claim 12 wherein the execution units are configured to access a variable number of static random-access memory (SRAM) memories based on neural network size.

* * * * *